(12) United States Patent
Allen et al.

(10) Patent No.: US 10,055,400 B2
(45) Date of Patent: Aug. 21, 2018

(54) MULTILINGUAL ANALOGY DETECTION AND RESOLUTION

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/349,615

(22) Filed: Nov. 11, 2016

(65) Prior Publication Data

US 2018/0137099 A1 May 17, 2018

(51) Int. Cl.
*G06F 17/27* (2006.01)
*G06F 17/28* (2006.01)
*G06F 17/24* (2006.01)

(52) U.S. Cl.
CPC ........ *G06F 17/2785* (2013.01); *G06F 17/241* (2013.01); *G06F 17/274* (2013.01); *G06F 17/2705* (2013.01); *G06F 17/2836* (2013.01)

(58) Field of Classification Search
CPC ..................................................... G06F 17/28
USPC ........................................................ 704/2–8
See application file for complete search history.

(56) References Cited

U.S. PATENT DOCUMENTS 5,675,710 A * 10/1997 Lewis ............... G06F 17/30707
706/12
6,523,026 B1 2/2003 Gillis
7,552,051 B2 6/2009 Privault et al.
8,190,422 B2 5/2012 Ascoli et al.
8,600,736 B2 12/2013 Ball
8,738,353 B2 5/2014 Soumare
(Continued)

FOREIGN PATENT DOCUMENTS

GB 002288258 10/1995

OTHER PUBLICATIONS

Gladkova et al. "Analogy-based Detection of Morphological and Semantic Relations with Word Embeddings: What Works and What Doesn't". Proceedings of NAACL-HLT 2016, pp. 8-15, San Diego, California, Jun. 12-17, 2016.*
(Continued)

*Primary Examiner* — Jesse Pullias
(74) *Attorney, Agent, or Firm* — Lieberman & Brandsdorfer, LLC

(57) ABSTRACT

Embodiments relate to an intelligent computer platform to decipher and translate an analogical phrase. A phrase in a source language is parsed into two or more grammatical sub-components, and a category for each parsed grammatical sub-component is identified. Two or more attributes and definitions of the parsed grammatical components are determined in the first language. These attributes and definitions are translated to a second language. A data source is searched for a meaning of the first language phrase, and the first language phrase is translated to a second language phrase. The second language phrase is converged with the attributes and definitions to produce a target phrase. Second language phrases are searched in a second data source and the target phrase is scored against them. A ranking is applied to the second language phrases and a final phrase is output responsive to the ranking.

12 Claims, 7 Drawing Sheets

(56) References Cited

U.S. PATENT DOCUMENTS

| | | |
|---|---|---|
| 8,744,834 B2 | 6/2014 | Macherey et al. |
| 8,762,131 B1 | 6/2014 | Diaconescu et al. |
| 8,788,261 B2 * | 7/2014 | Sikstrom ............. G06F 17/2785 |
| | | 704/255 |
| 9,588,965 B2 * | 3/2017 | Pedanekar .............. G06F 17/28 |
| 2004/0128122 A1 | 7/2004 | Privault et al. |
| 2009/0063131 A1 | 3/2009 | Soumare |
| 2010/0004920 A1 | 1/2010 | Macherey et al. |
| 2010/0030553 A1 | 2/2010 | Ball |
| 2014/0136184 A1 | 5/2014 | Hatsek et al. |
| 2014/0180677 A1 * | 6/2014 | McCaffrey ........ G06F 17/30654 |
| | | 704/9 |
| 2016/0104481 A1 | 4/2016 | Ehsani et al. |

OTHER PUBLICATIONS

Akbari, Strategies for Translating Idioms, Journal of Academic and Applied Studies (Special Issue on Applied Linguistics), vol. 3(8), Aug. 2013, pp. 32-41.

Smets et al., Translation of Verbal Idioms, May 2002.

Wikibooks, Idioms, Spanish/Idioms, http://en.wikibooks.org/wiki/Spanish/Idioms, last modified May 24, 2016.

Garera et al., Minimally Supervised Multilingual Taxonomy and Translation Lexicon Induction, Department of Computer Science Center for Language and Speech Processing, Johns Hopkins University, 2008.

Cheng et al., Creating Multilingual Translation Lexicons with Regional Variations Using Web Corpora, ACL '04 Proceedings of the 42nd Annual Meeting on Association for Computational Linguistics, Article No. 534, Barcelona, Spain Jul. 21-26, 2004.

List of IBM Patents or Applications Treated as Related, Nov. 2016.

\* cited by examiner

MULTILINGUAL ANALOGY DETECTION AND RESOLUTION

BACKGROUND

The present invention relates to natural language processing. More specifically, the invention relates to recognizing and resolving an analogical pattern in a multilingual scenario.

In the field of artificially intelligent computer systems, natural language systems (such as the IBM Watson™ artificially intelligent computer system or and other natural language question answering systems) process natural language based on knowledge acquired by the system. To process natural language, the system may be trained with data derived from a data source or corpus of knowledge, but the resulting outcome can be incorrect or inaccurate for a variety of reasons relating to the peculiarities of language constructs and human reasoning.

For example, analogies are language constructs which enable people to transfer knowledge from one situation or context (the source) to another (the target) based on a conceptual similarity there between, and provide powerful cognitive mechanisms or tools that can be used to explain something that is unknown in terms of a related concept that is known to someone. At the core of analogical reasoning lies the concept of similarity, but the process of understanding an analogy requires reasoning from a relational perspective that can be challenging Adding to the challenge is addressing the understanding and relationship across languages where word-for-word translation may not capture the essence of the original statement. In addition, automated systems and other natural language systems which come across an analogy in a question or answer corpus will also have a difficult time with identifying and understanding analogies. As a result, existing solutions for efficiently identifying and understanding analogies for training and/or use by a natural language processing system are extremely difficult at a practical level.

SUMMARY

The embodiments include a system, computer program product, and method for resolving the meaning of an analogy across languages.

In one aspect, a system is provided for use with an intelligent computer platform for deciphering an analogical phrase. A processing unit is operatively coupled to memory and is in communication with an artificial intelligence platform. A tool, in communication with the processing unit, is activated by the artificial intelligence platform and employed to decipher a phrase. More specifically, deciphering the phrase includes a parse of a first language phrase into two or more grammatical sub-components and identification of a category for each parsed sub-component. The categories are employed to determine metadata and definitions of the parsed sub-components in the first language. Thereafter, one or more of the definitions of the parsed sub-components are translated to at least one second language definition. A search takes place employing a first data source to ascertain a meaning of the first language phrase, with the first data source storing at phrase and a corresponding meaning in the first language. The meaning is translated to the second language to create a second language meaning. Thereafter, the second language meaning is converged with both the metadata and the second language definitions, with the convergence to product a target phrase. A second data source is employed to score the target phrase against second language phrases. A ranking of the second language phrases is applied with respect to the target phrase. A final phrase and meaning in the second language are generated and output in response to the ranking.

In another aspect, a computer program device is provided for use with an intelligent computer platform for deciphering an analogical phrase. The device has program code embodied therewith. The program code is executable by a processing unit to decipher a phrase. More specifically, deciphering the phrase includes program code to a parse of a first language phrase into two or more grammatical sub-components and identify of a category for each parsed sub-component. The categories are employed to determine metadata and definitions of the parsed sub-components in the first language. Thereafter, program code is employed to translate the attribute(s) and definition(s) to second language attribute(s) and definition(s). The program code searches a first data source to ascertain a meaning of the first language phrase, with the first data source storing at phrase and a corresponding meaning in the first language. The meaning is translated to the second language to create a second language meaning. Thereafter, program code converges the second language meaning with both the metadata and the second language definitions, with the convergence to product a target phrase. A second data source is employed and the program code scores the target phrase against second language phrases. The program code applies a ranking of the second language phrases with respect to the target phrase. A final phrase and meaning in the second language are generated and output in response to the ranking.

In yet another aspect, a method is provided for use by an intelligent computer platform for deciphering an analogical phrase. The method parses of a first language phrase into two or more grammatical sub-components and identification of a category for each parsed sub-component. The categories are employed to determine metadata and definitions of the parsed sub-components in the first language. Thereafter, a translation takes place with the definition(s) of the parsed sub-components to at least one second language definition. A search takes place employing a first data source to ascertain a meaning of the first language phrase, with the first data source storing at phrase and a corresponding meaning in the first language. A translation of the meaning to the second language creates a second language meaning. Thereafter, the second language meaning is converged with both the metadata and the second language definitions, with the convergence producing a target phrase. The target phrase is scored again the second language phrases, and a ranking of the second language phrases is applied with respect to the target phrase. A final phrase and meaning in the second language are generated and output in response to the ranking.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
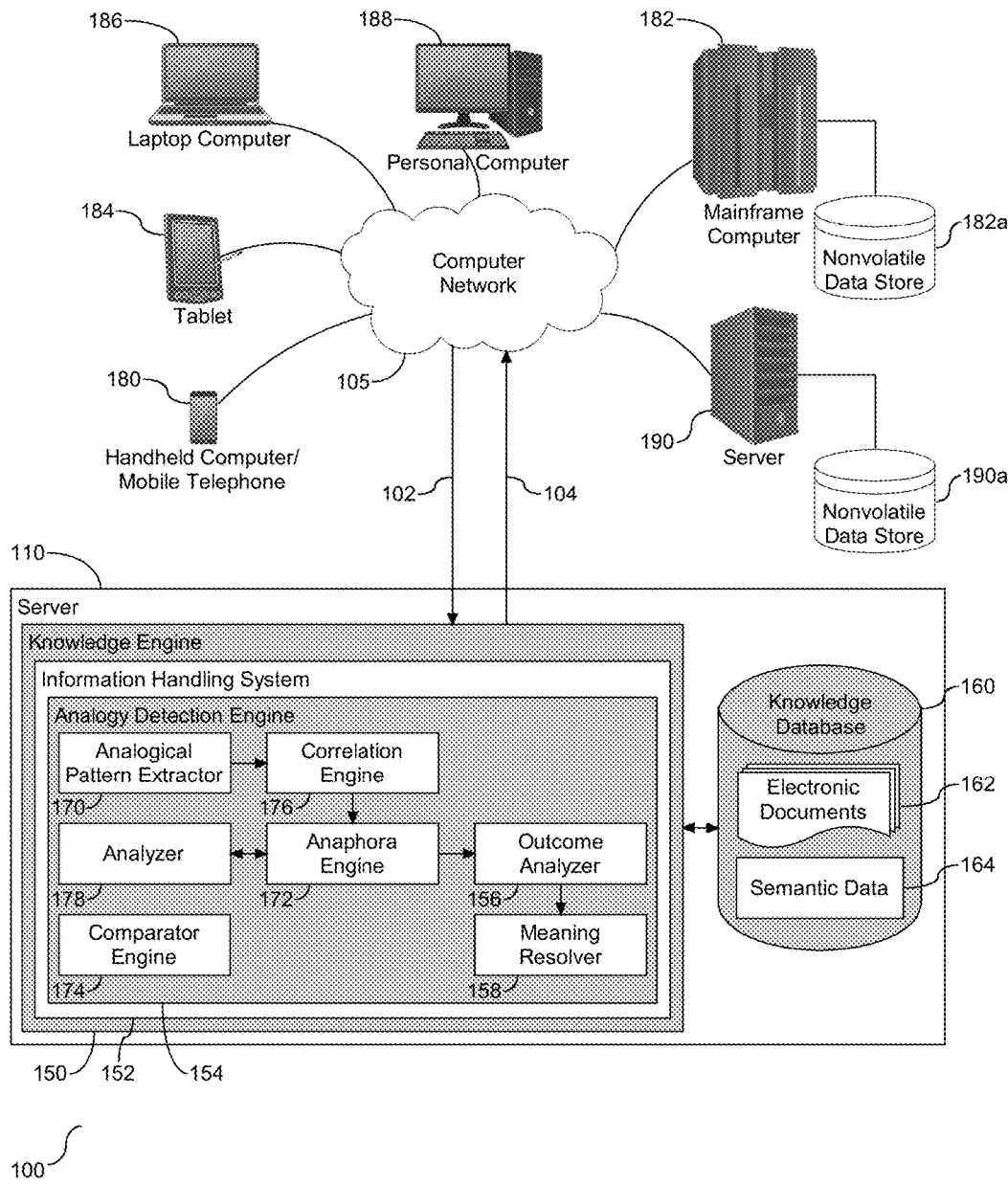
FIG. 1 depicts a system diagram illustrating a content and response system connected in a network environment that uses an analogy detection engine to identify and analyze analogies.

Referring to FIG. 1, a schematic diagram of a natural language process system (100) is depicted. As shown, a server (110) is provided in communication with a plurality of computing devices (180), (182), (184), (186), and (188) across a network connection (105). The server (110) is configured with a processing unit in communication with memory across a bus. The server (110) is shown with a knowledge engine (150) for natural language processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable analogical pattern recognition and resolution for one or more content users. Other embodiments of the server (110) may be used with components, systems, sub-systems, and/or devices other than those that are depicted herein.

The knowledge engine (150) may be configured to receive input from various sources. For example, knowledge engine (150) may receive input from the network (105), one or more knowledge bases of corpus (160) of electronic documents (162), semantic data (164), or other data, content users, and other possible sources of input. In selected embodiments, the knowledge base (160), also referred to herein as corpus, may include structured, semi-structured, and/or unstructured content in a plurality of documents that are contained in one or more knowledge data sources or corpi. The various computing devices (180), (182), (184), (186), and (188) in communication with the network (105) may include access points for content creators and content users. Some of the computing devices may include devices for a data source storing the corpus of data as the body of information used by the knowledge engine (150) to generate an analogical pattern outcome (104). The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/or structured data sources. In this manner, some processes populate the knowledge engine (150) with the knowledge engine (150) also including input interfaces to receive requests and respond accordingly.

As shown, content may be in the form of one or more electronic documents or files (162) for use as part of the corpus (160) of data with the knowledge engine (150). The corpus (160) may include any structured and unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively translate an analogy present in the submissions by content in the corpus of data. As further described below, when a process evaluates a given section of a document for semantic content, the process can use a variety of conventions to query it from the knowledge engine (150). Semantic content is content based on the relation between signifiers, such as words, phrases, signs, and symbols, and what they stand for, their denotations, or connotation. In other words, semantic content is content that interprets an expression, such as by using Natural Language (NL) processing. In one embodiment, the process sends well formed content (102), e.g. natural language text, to the knowledge engine (150), so that the content (102) may be interpreted and the knowledge engine (150) may provide a response in the form of one or more outcomes (104). In one embodiment, the knowledge engine (150) may provide a response in the form of a ranked list of outcomes (104).

In some illustrative embodiments, server (110) may be the IBM Watson™ system available from International Business Machines Corporation of Armonk, N.Y., which is augmented with the mechanisms of the illustrative embodiments described hereafter. The IBM Watson™ knowledge manager system may receive input content (102) which it then parses to extract the major features of the content (102) that in turn are then applied to the corpus of data stored in the knowledge base (160). Based on application of the content (102) to the corpus of data, a set of candidate outcomes are generated by looking across the corpus of data for portions of the corpus of data that have some potential for containing a matching analogical pattern to the submitted content (102). The corpus of data may include data sources with phrase meanings, word attributes and/or definitions, and language translations of the aforementioned.

In particular, received content (102) may be processed by the IBM Watson™ server (110) which performs analysis on the language of the input content (102) and the language used in each of the portions of the corpus of data found during application of the content using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input content (102) and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response (104) is inferred by the input content (102) based on the specific area of focus of that reasoning algorithm. Each resulting score is weighted against a statistical model. The statistical model captures how well the reasoning algorithm performed at establishing the inference between two similar passages for a particular domain during the training period of the IBM Watson™ system. The statistical model may be used to summarize a level of confidence that the IBM Watson™ system has regarding the evidence that the potential response (104), i.e., candidate analogy, is inferred by the submitted content (102) question. This process may be repeated for each of the candidate outcomes (104) until the IBM Watson™ system (110) identifies candidate outcomes that surface as being significantly stronger than others and thus, generates a final analogy outcome (104), or ranked set of outcomes, for the input content (102).

To process natural language, the system (110) may include an information handling system (152) which uses an analogy detection engine (154) to identify and analyze analogies by detecting and categorizing analogical patterns, generating potential meanings for each detected analogical pattern from characteristic metadata for terms in the analogical pattern, and identifying a best meaning for the detected analogical pattern by analyzing and scoring the potential meanings based on the characteristic metadata and terms in the detected analogical pattern. Though shown as being embodied in or integrated with the server (110), the information handling system (152) and/or analogy detection engine (154) may be implemented in a separate computing system (e.g., 190) that is connected across network (105) to the server (110). Wherever embodied, the analogy detection engine (154) detects and categorizes analogical patterns, generates potential meanings for each detected analogical pattern, and identifies a best meaning for the detected analogical pattern by analyzing and scoring the potential meanings based on the characteristic metadata and terms in the detected analogical pattern.

In selected example embodiments, the analogy detection engine (154) may include an analogical pattern extractor (170) that is configured to apply NL processing to detect an analogy in a source text segment by mapping parsed terms and phrases from the sentence into one or more potential analogical patterns. As described in more detail with reference to FIGS. 3 and 4, the analogical pattern extractor (170) may perform a sentence structure analysis to parse sentences and denote terms identifying one or more analogical patterns having a source analogic (e.g., source term type and analogical phrase) connected by a comparator to a target analogic (e.g., target analogical phrase and characteristic term). For example, the information handling system may use a Slot Grammar Logic (SGL) parser to perform parse of a source sentence to detect one or more specified analogical patterns (e.g., "[noun] [verb] like [x] as a [y]" or variations thereof, such as "[noun] [verb phrase] [comparator] [adjective] [noun phrase]"). The analogical pattern extractor (170) may also be configured to apply one or more learning methods to match a detected analogical pattern to known patterns to decide and categorize the source sentence as an analogy.

As shown, the analogy detection engine (154) employs three sub-engines to support resolution of the analogical pattern, including an anaphora engine (172), a comparator engine (174), and a correlation engine (176). The anaphora engine (172) functions to resolve the anaphora, and in one embodiment resolve the relationship of the anaphora to the noun, as identified by the analogy detection engine (170). The comparator engine (174) functions to resolve the comparator, and more specifically to identify how the comparator is being employed in the context of the parsed sentence. The correlation engine (176) functions to identify the relationship or connection of keywords in the parsed sentence, and to apply analytic analysis to refine specific terms in the detected analogical pattern for entity resolution, ontology, and other term characteristics or metadata (e.g., by using the definition of the terms and ontology) for use in determining the outcome or meaning of the analogy.

The analysis performed by the correlation engine (176) may use the right or left analogic to search the corpus or knowledge database (160) for matching references to provide evidence for possible meaning to the analogy. The retrieved evidence references may then be processed to normalize the reference type or attribute (e.g., for the noun or object or verb term). To support the normalization process, the correlation engine (176) may also use the words in the definition or meaning of the term in addition to major characteristics associated with the term to assist the pattern correlator in assignment and resolving a term. As a result of processing the retrieved evidence references, potential meanings for each detected analogical pattern are generated from the analogical pattern terms and associated characteristic metadata.

To evaluate which of the potential meanings best corresponds to the detected analogical pattern, the analogy detection engine (154) may be configured to use the definitions of the terms and ontology in the analogical pattern to determine and score potential meanings of the analogy based on the options from the term characteristic alignments and their agreements when combined. For example, the analogy detection engine (154) may include an outcome analyzer (156) for applying an outcome analysis to the analogical pattern and associated metadata to look at the noun-verb-object relationships and the categories to determine the most likely options by scoring the terms and likelihood they belong together or are should be associated. The outcome analyzer (156) may apply a learning method for previously similar analogies or noun-verb relationship in a similar pattern, along with definition extraction for the verb in relation to the noun/object characteristics and the comparator/idiomatic used. The meaning of the detected analogical pattern may be deduced at the meaning resolver (158) as a combination of the source analogic characteristic and metadata with the target analogic outcome, and then presented with the evidence from the characteristics and meaning and any corpus references that are used to help the determination.

The anaphora engine (172) and the comparator engine (174) generate an idiomatic structure and associated feature sets, which is shown and described in FIG. 1. An analyzer (178) functions as an interface between the generated idiomatic structure(s) and the corpus (160). More specifically, the analyzer (178) searches the corpus (160) for evidence of the pattern, both as an entire analogical pattern, and as a subset of a pattern. The corpus (160) may be divided into two or more data sources. Multiple data sources allow for the organization of different categories of data. For example, one data source may contain complete phrases in a first language, while another data source may contain phrases in a second language. Likewise, one data source may contain phrases while another data source contains idioms. The analyzer (178) applies a score to each feature set according to its incidence in the corpus (160). An outcome (104) for the analyzer (178) is in the form of an analogical pattern that matches or closely matches the submitted sentence. More specifically, the outcome (104) is based on the scoring, and in one embodiment, associated ranking of a plurality of potential outcomes.

Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems. An illustrative example of an information handling system showing an exemplary processor and various components commonly accessed by the processor is shown and described in FIG. 2.

Figure 2:
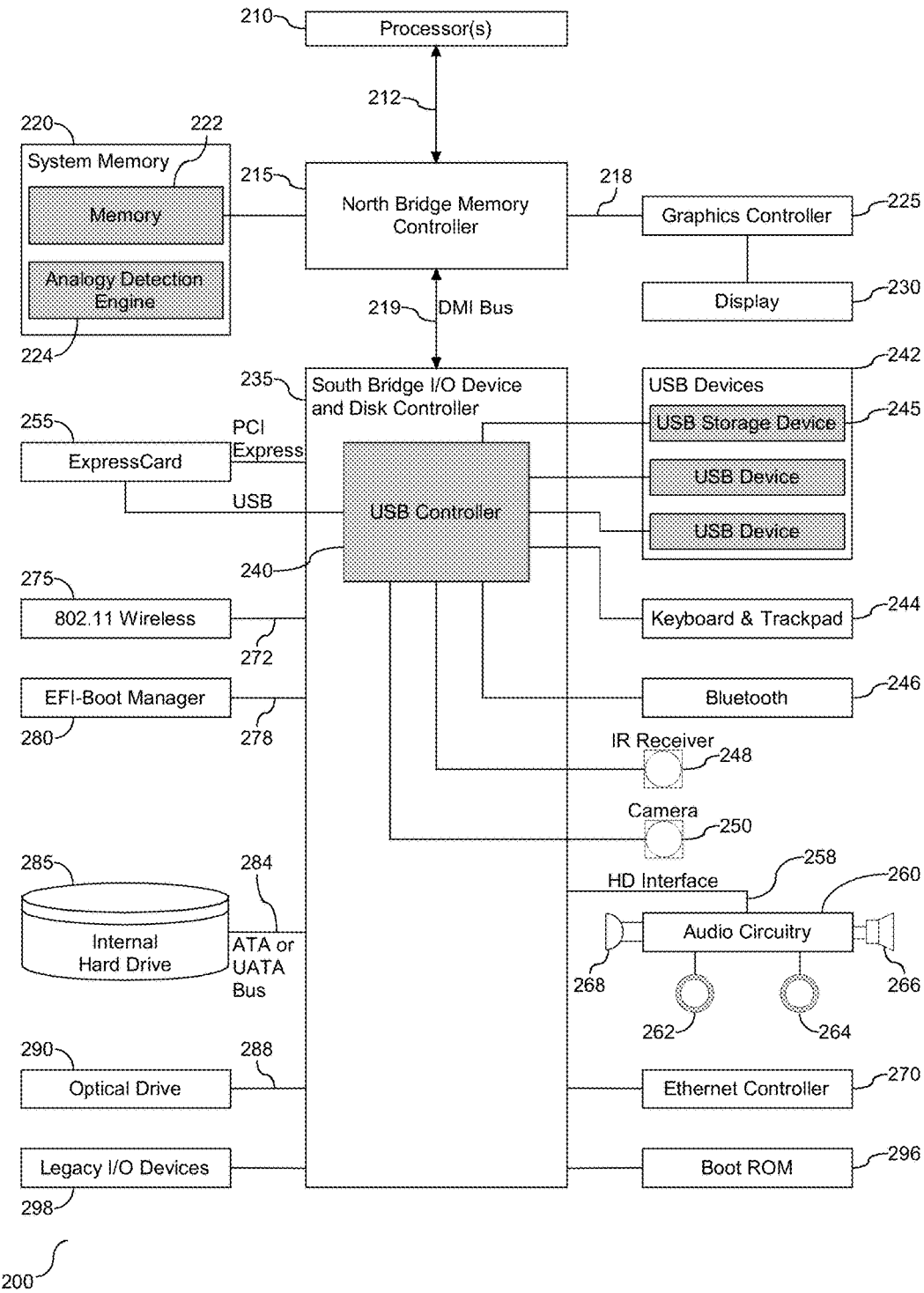
FIG. 2 depicts a block diagram of a processor and components of an information handling system such as those shown in FIG. 1.

Referring to FIG. 2, a block diagram (200) is provided illustrating information handling system. As shown, one or more processors (210) are coupled to processor interface bus (212), which connects processors (210) to Northbridge (215), which is also known as the Memory Controller Hub (MCH). Northbridge (215) connects to system memory (220) and provides a means for processor(s) (210) to access the system memory (220). In the system memory (220), a variety of programs may be stored in one or more memory devices, including an analogy detection engine (221) which may be invoked to detect an analogy by parsing or breaking a sentence into a discrete analogical pattern and then use definitions of the terms in the analogical pattern(s) to determine the potential meanings of the analogy. Graphics controller (225) also connects to Northbridge (215). In one embodiment, PCI Express bus (218) connects Northbridge (215) to graphics controller (225). Graphics controller (225) connects to display device (230), such as a computer monitor.

Northbridge (215) and Southbridge (235) connect to each other using bus (219). In one embodiment, the bus is a Direct Media Interface (DMI) bus that transfers data at high speeds in each direction between Northbridge (215) and Southbridge (235). In another embodiment, a Peripheral Component Interconnect (PCI) bus connects the Northbridge and the Southbridge. Southbridge (235), also known as the I/O Controller Hub (ICH) is a chip that generally implements capabilities that operate at slower speeds than the capabilities provided by the Northbridge (215). Southbridge (235) typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM (296) and "legacy" I/O devices (298) (using a "super I/O" chip). The "legacy" I/O devices (298) can include, for example, serial and parallel ports, keyboard, mouse, and/or a floppy disk controller. Other components often included in Southbridge (235) include a Direct Memory Access (DMA) controller, a Programmable Interrupt Controller (PIC), and a source device controller, which connects Southbridge (235) to nonvolatile source device (285), such as a hard disk drive, using bus (284).

ExpressCard (255) is a slot that connects hot-pluggable devices to the information handling system. ExpressCard (255) supports both PCI Express and USB connectivity as it connects to Southbridge (235) using both the Universal Serial Bus (USB) the PCI Express bus. Southbridge (235) includes USB Controller (240) that provides USB connectivity to devices that connect to the USB. These devices include webcam (camera) (250), infrared (IR) receiver (248), keyboard and trackpad (244), and Bluetooth device (246), which provides for wireless personal area networks (PANs). USB Controller (240) also provides USB connectivity to other miscellaneous USB connected devices (242), such as a mouse, removable nonvolatile source device (245), modems, network cards, ISDN connectors, fax, printers, USB hubs, and many other types of USB connected devices. While removable nonvolatile source device (245) is shown as a USB-connected device, removable nonvolatile source device (245) could be connected using a different interface, such as a Firewire interface, etc.

Wireless Local Area Network (LAN) device (275) connects to Southbridge (235) via the PCI or PCI Express bus (272). LAN device (275) typically implements one of the IEEE 802.11 standards for over-the-air modulation techniques to wireless communicate between information handling system (200) and another computer system or device. Extensible Firmware Interface (EFI) manager (280) connects to Southbridge (235) via Serial Peripheral Interface (SPI) bus (278) and is used to interface between an operating system and platform firmware. Optical source device (290) connects to Southbridge (235) using Serial ATA (SATA) bus (288). Serial ATA adapters and devices communicate over a high-speed serial link. The Serial ATA bus also connects Southbridge (235) to other forms of source devices, such as hard disk drives. Audio circuitry (260), such as a sound card, connects to Southbridge (235) via bus (258). Audio circuitry (260) also provides functionality such as audio line-in and optical digital audio in port (262), optical digital output and headphone jack (264), internal speakers (266), and internal microphone (268). Ethernet controller (270) connects to Southbridge (235) using a bus, such as the PCI or PCI Express bus. Ethernet controller (270) connects information handling system (200) to a computer network, such as a Local Area Network (LAN), the Internet, and other public and private computer networks.

While FIG. 2 shows one information handling system (200), an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
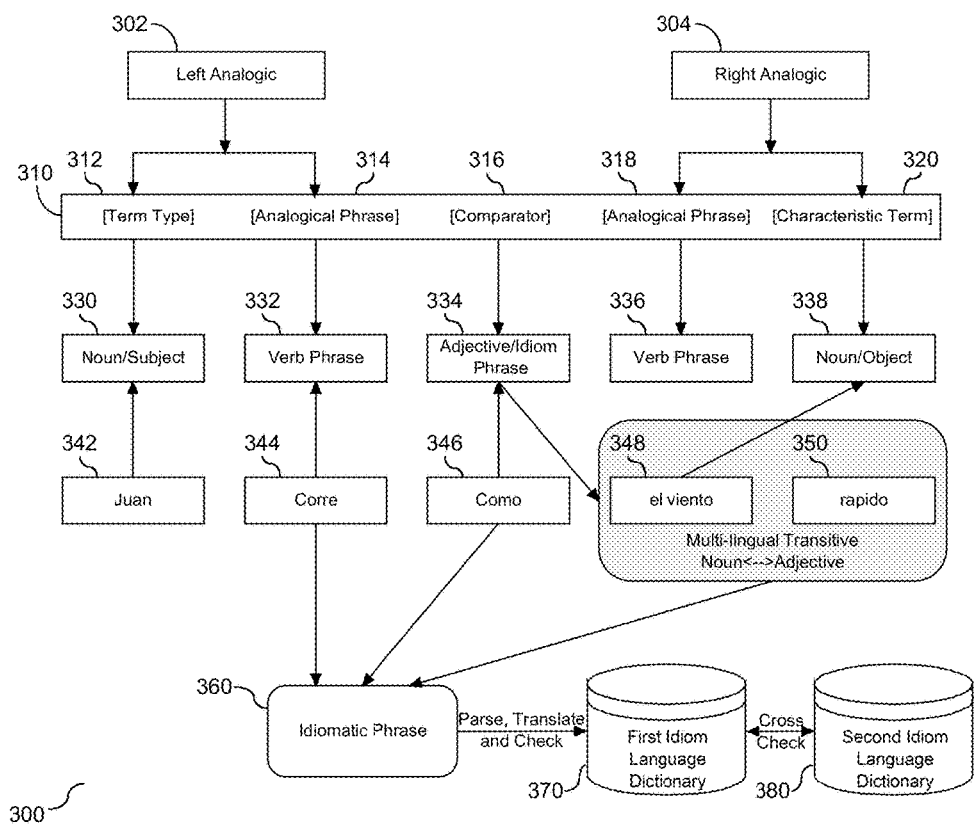
FIG. 3 depicts a block diagram illustrating a linguistic analysis for multilingual analogy detection and resolution.

Referring to FIG. 3, a block diagram (300) is provided illustrating linguistic parsing and analysis to identify an analogical pattern. As disclosed herein, the linguistic analysis processing may be performed by a natural language processing system, such as the information handling system (152) as shown in FIG. 1, or any suitable information handling system. A sentence parsing tool, such as but not limited to SGL, is applied to separate a received sentence into its constituent parts to find the sentence parts and location sequence. For example, the sentence is received and a parsing process applied to the sentence identifies the sentence terms and structure. As shown, the received sentence is matched with an identified analogical pattern (310). More specifically, the matching patterns includes a term type (312), an analogical phrase (314), also referred to herein as a left or first analogical phrase, a comparator (316), an analogical phrase (318), also referred to herein as a right or second analogical phrase, and a characteristic term (320). The term type (312) and the first analogical phrase (314) are referred to herein as a first or left analogic (302), and the second analogical phrase (318) and characteristic term (320) are referred to herein as a second or right analogic (304). Accordingly, through the sentence parsing tool, the structure of the sentence is identified and matched with an analogical pattern.

The sentence parsing tool or related SGL process is applied to the sentence to further separate the sentence components into constituent parts (330)-(338) and associated location sequence. The sentence parsing tool identifies the terms and structures as including a subject noun term (330), a verb phrase (332), an adjective or idiom phrase (334), a preposition/verb phrase (336) and a noun/object term (338). Each of the identified terms and structure may include various grammatical terms. For example, the noun term (330) may include any one of an entity, ontology type, subject, hypernym, or hyponym; the verb phrase (332) and/or preposition/verb phrase (336) may include any one of a verb phrase, verb definition words, and correlated keyword; the adjective or idiom phrase (334) may include any one of an idiom, idiomatic phrase, meaning, meaning structure, or resolved anaphora; the preposition/verb phrase (336) may include a comparator or resolved comparator; and the noun/object (338) may include any one of a noun phrase, adjective, definition words, and correlated keywords.

In an example shown in FIG. 3, the terms "Juan", "cone", "como", "el viento", and "rapido" may be stored in separate data locations, e.g. data sources, within data source or categorized differently, or in one embodiment, they may be stored in the same data location. In one embodiment, data sources may be organized by language so as to enable parallel searching of a phrase. In the example shown in FIG. 3, "Juan" (342) is identified as a possible subject/person (330), "corre" (344) is identified as a possible verb (332) defined in the English language as "run", "como" (346) is identified as the idiom (334), and is defined in the English language as "like", "el viento" (348) is identified as a possible noun/object (338), which translates in the English language to "the wind", and "rapido" (350) is identified as a possible adjective (334), and in the English language is translated to "quickly". The terms may be identified by manually inputting them into the respective data sources or categories, or by machine-learning program from previously populated data sources with encountered phrases. Depending on the language in the sentence, the grammatical parsing may generate different sentence terms and/or structures. To further assist with analogy detection processing, each of the parsed sentence terms or parts (330)-(338) may be further analyzed for entity resolution, ontology, and/or associated characteristics in order to generate pattern characteristic metadata for use in refining the terms of the detected analogical pattern.

As shown, the parsed sentence terms or parts (312)-(320) of the sentence (310) are categorized into an analogical pattern in the source language, shown herein as a first or left analogic (302) having the first term type (312) and the first analogical phrase (314) that is connected by a comparator (316) to a second or right analogic (304) shown herein as having the second analogical phrase (318) and the characteristic term (320). The analogical pattern categorization process may be implemented by applying a learning method to match various combinations of the parsed sentence terms or parts (312)-(320) to one or more known analogical patterns to decide and categorize the sentence or phrase (310) as an analogy. If the syntactic structure of a combination pattern of parsed sentence terms or parts (312)-(320) match a known analogical pattern in the source language, the relevant analogy terms and pattern types in the source language are identified as a candidate meaning and associated for use in subsequent processing. For example, the detected analogy pattern may be (noun like, as a, etc), and the object noun term may be pulled and associated with the object verb phrase. The idiomatic phrase (360) is then searched on a source language idiom dictionary (370), also referred to herein as a first language idiom dictionary. The language idiom dictionary can be in the form of a corpus or data source containing idiom phrases in the target language. The phrase (360) may also be cross checked with a target language idiom dictionary (380), also referred to herein as a second language idiom dictionary, for equivalent idioms in the target language. The target language shown in FIG. 3 is shown to be English, however, the target language idiom dictionary (380) may be any language to which the translation is being made.

Figure 4:
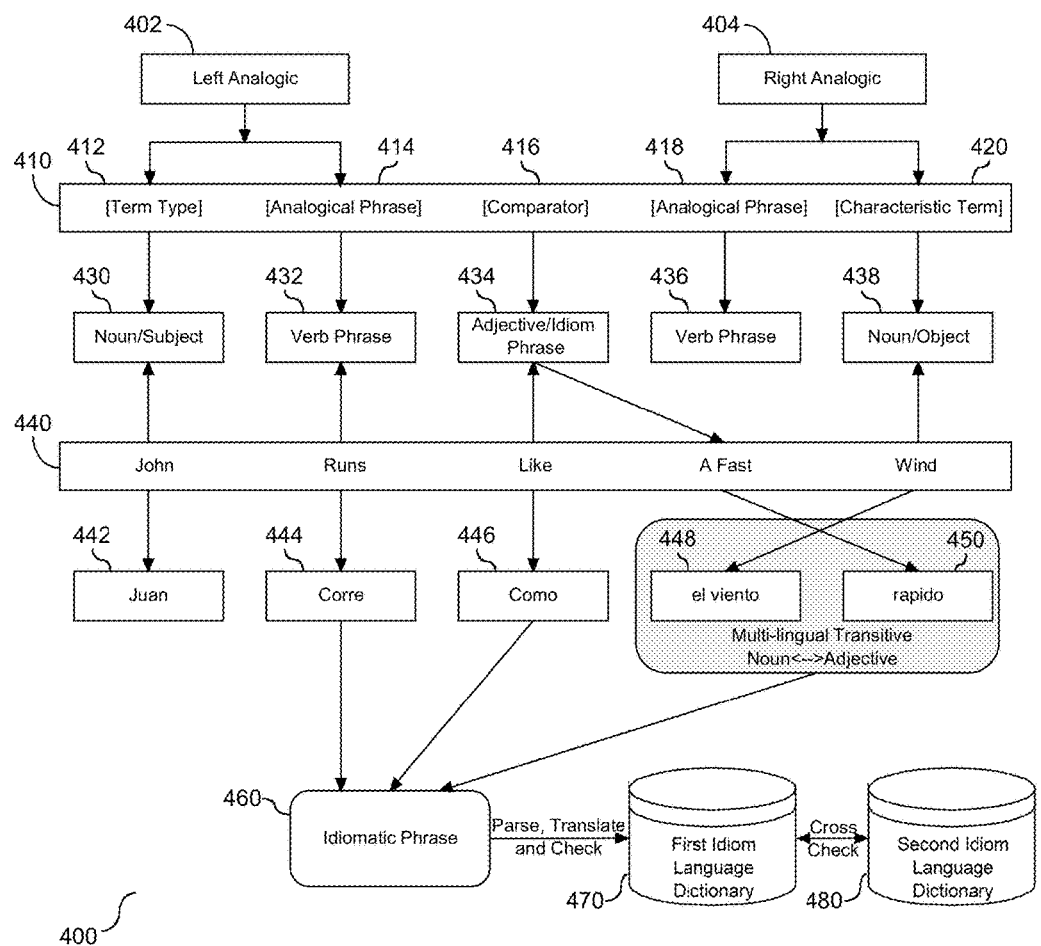
FIG. 4 depicts a block diagram illustrating an example application of linguistic parsing and analysis to identify an analogical pattern of a phrase in the English language and translation of the phrase to the Spanish language.

Referring to FIG. 4, a block diagram (400) is provided illustrating application of linguistic parsing and analysis to identify an analogical pattern of a phrase in the English language and translation of the phrase to the Spanish language. In the example shown, "John runs like a fast wind" (440) is the received source sentence. A sentence parsing tool, such as but not limited to SGL, is applied to separate the received sentence into its constituent parts to identify the sentence parts and location sequence in the source language, e.g. the original language of the received sentence. The received sentence (440) is matched with an identified analogical pattern (410). Similar to the pattern shown in FIG. 3, the matching patterns includes a term type (412), an analogical phrase (414), also referred to herein as a left or first analogical phrase, a comparator (416), an analogical phrase (418), also referred to herein as a right or second analogical phrase, and a characteristic term (420). The term type (412) and the first analogical phrase (414) are components of the first or left analogic (402), and the second analogical phrase (418) and characteristic term (420) are components of the second or right analogic (404). Accordingly, through the sentence parsing tool, the structure of the sentence in the source language is identified and matched with an analogical pattern.

With regard to the phrase (440), the word "John" is identified to be a noun or subject (430) and correlated to be a term type (412). The word "John" is also individually translated to a target language, i.e. Spanish, to produce the translation "Juan" (442) as the Spanish equivalent of the name "John". The same step is repeated for the other components of the phrase: the word "runs" is identified to be a verb phrase (432), correlated to be an analogical phrase (414), and translated to the Spanish word "cone" (444); the word "like" is identified to be an idiom phrase (434), correlated to be a comparator (416), and translated to the Spanish word "como" (446); the word "fast" is identified to be an adjective (434), and translated to the Spanish word "rapido" (450); the word "wind" is identified to be a noun or object (438), correlated to be a characteristic term (420), and translated to the Spanish word "viento" (448). As shown in FIG. 4, some phrases received in the source language may incorporate other elements such as a verb phrase (436). For example, replacing the original phrase for the phrase "John runs like a flowing wind" replaces the adjective (434), i.e. "fast", for the verb (436) "flowing". In this example, the word "flowing" would be identified to be a verb phrase (436) and correlated to be an analogical phrase (418).

The sentence components are determined to have definitions or attributes. The definitions or attributes are translated from the source language to the target language. In the example shown herein, the idiomatic phrase (460) is presented to an idiom dictionary in the source language (470)), also referred to herein as a first language idiom dictionary or a source language idiom dictionary, to search for a meaning of the idiom. The source language idiom dictionary can be in the form of a corpus or data source containing idiom phrases in the target language. The meaning obtained from the source language dictionary (470) is translated to the target language and converged with the translated definitions and attributes from the components of the parsed phrase (440). The result of the convergence is a target phrase in the target language, that incorporates the translated meaning, definitions, and attributes of the original phrase or sentence (440). The target language shown in FIG. 4 is shown to be English and the translation is shown to be Spanish, however, the target language idiom dictionary (480), also referred to herein as a second language idiom dictionary, may be any language to which the translation of the source sentence is being made.

Embodiments associated with the sentence parsing and analogy translation may be in the form of a system with an intelligent computer platform for deciphering analogical phrases. A processing unit is operatively coupled to memory and is in communication with an artificial intelligence platform. A tool or analogy detection engine (154), also in communication with the processing unit, is employed to decipher a phrase upon activation by the artificial intelligence platform. The procedure of deciphering the phrase includes parsing a phrase received in a first language into two or more grammatical sub-components, identifying a category for each parsed grammatical sub-component, and utilizing the identified categories to determine two or more attributes and definitions of the parsed grammatical components in a first language, also referred to herein as a source language. The tool translates the two or more attributes and definitions to a second language, also referred to herein as a target language, thus yielding second language attributes and definitions.

A search is conducted in a first data source for a meaning of the first language phrase, whereby the first data source stores phrases and corresponding meanings in the first language. Thereafter, the meaning is translated to the second language thus yielding a second language meaning. The tool (154) converges the second language meaning with the second language attributes and definitions to produce a target phrase in the second language. A search of the target phrase is conducted in a second data source to find similar phrases in the second language. Based on the results of the search, the tool applies a ranking to the second language phrases according to similarity to the target phrase, and a final phrase is outputted from the ranking. More specifically, the final phrase identifies the second language phrase with the highest similarity in the ranking to the target language phrase. In one embodiment, the information handling system (152) applies the final phrase to first language phrase, and more specifically annotates the first language phrase, in an artificial intelligence system.

Alternatively, the tool (154) may commence deciphering the phrase in the source language by translating a first language phrase, e.g. source language, to a second language phrase, e.g. target language, whereby the translation is performed for each individual word within the first language phrase. The tool (154) further searches a data source for at least one phrase pattern in the data source that matches the second language phrase. If the tool does not find any matches in the data source, the second language phrase becomes the final output. However, if the tool does find a match in the data source, an idiom data source, also referred to herein as a corpus, is searched for one or more idiom phrases that match the second language phrase. If the tool finds no matches in the idiom data source, the second language phrase is outputted as the final output. If the tool finds at least one match in the idiom data source, a ranking is applied to the idiom phrases that match according to similarity of each found phrase to the second language phrase. The matching idiom phrase with a highest similarity in the ranking is outputted as the final output. The details of the process undertaken by the tool in this embodiment are shown and described below with reference to FIG. 6.

Embodiments may also be in the form of a computer program device for use with an intelligent computer platform in order to assist the intelligent computer platform to decipher analogical phrases. The device has program code embodied therewith. The program code is executable by a processing unit to parse a phrase received in a first language, also referred to herein as a source or native language, into two or more grammatical sub-components, identify a category for each parsed grammatical sub-component, and utilize the identified categories to determine two or more attributes and definitions of the parsed grammatical components in the first language. The processing unit translates the two or more attributes and definitions to a second language, also referred to herein as a target language, thus yielding second language attributes and definitions. A search is conducted in a first data source for a meaning of the first language phrase, whereby the first data source stores phrases and corresponding meanings in the first language. The meaning is then translated to the second language thus yielding a second language meaning. The processing unit then converges the second language meaning with the second language attributes and definitions to produce a target phrase in the second language. A search of the target phrase is conducted in a second data source to find similar phrases in the second language. Based on the results of the search, the processing unit applies a ranking to the second language phrases according to similarity to the target phrase, and a final phrase is outputted from the ranking. More specifically, the final phrase identifies the second language phrase with the highest similarity in the ranking to the target language phrase.

In one embodiment, program code, executable by a processing unit, is employed to translate a first language phrase to a second language phrase, whereby the translation is performed for each individual word within the first language phrase. The program code searches a data source, e.g. corpus, for at least one phrase pattern that matches the second language phrase. If the search does not yield any matches in the data source, the second language phrase is outputted as a final output. However, if the search yields a match in the data source, an idiom data source is searched for one or more idiom phrases that match the second language phrase. If the search does not produce any matches in the idiom data source, the second language phrase is outputted as the final output. If the search produces at least two matches in the idiom data source, a ranking is applied to the idiom phrases that match with the ranking based on similarity between each matching phrase to the second language phrase. The matching idiom phrase with a highest similarity in the ranking is outputted as the final output.

Figure 5:
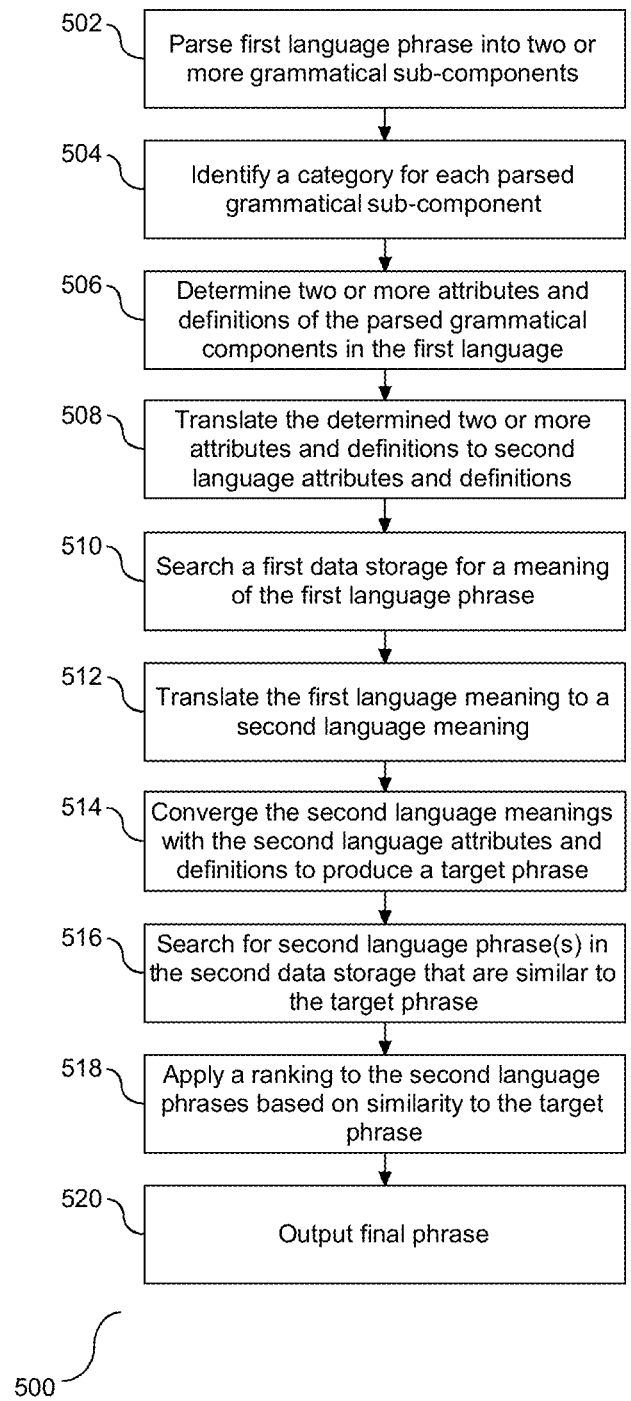
FIG. 5 depicts a flowchart illustrating a method, utilized by an information handling system for multilingual analogy detection and resolution.

With respect to FIG. 5, a flow chart (500) is provided illustrating an aspect of embodiments that may also take the form of a method for use by an intelligent computer platform for deciphering analogical phrases. As shown, a phrase in a first language is parsed into two or more grammatical sub-components in the first language (502), and a category for each parsed grammatical sub-component is identified (504). Utilizing the identified categories, two or more attributes and definitions of the parsed grammatical components in the first language are determined (506) and the attributes and definitions are translated to a second language, thus yielding second language attributes and definitions (508). A search is conducted in a first data source for a meaning of the first language phrase (510), whereby the first data source stores phrases and corresponding meanings in the first language. The meaning is then translated to the second language thus yielding a second language meaning (512). The second language meaning is converged with the second language attributes and definitions to produce a target phrase in the second language (514). A search of the target phrase is conducted in a second data source to find similar phrases in the second language (516). Based on the results of the search, a ranking is applied to the second language phrases according to similarity to the target phrase (518), and a final phrase is outputted from the ranking (520). More specifically, the final phrase identifies the second language phrase with the highest similarity in the ranking to the target language phrase.

Figure 6:
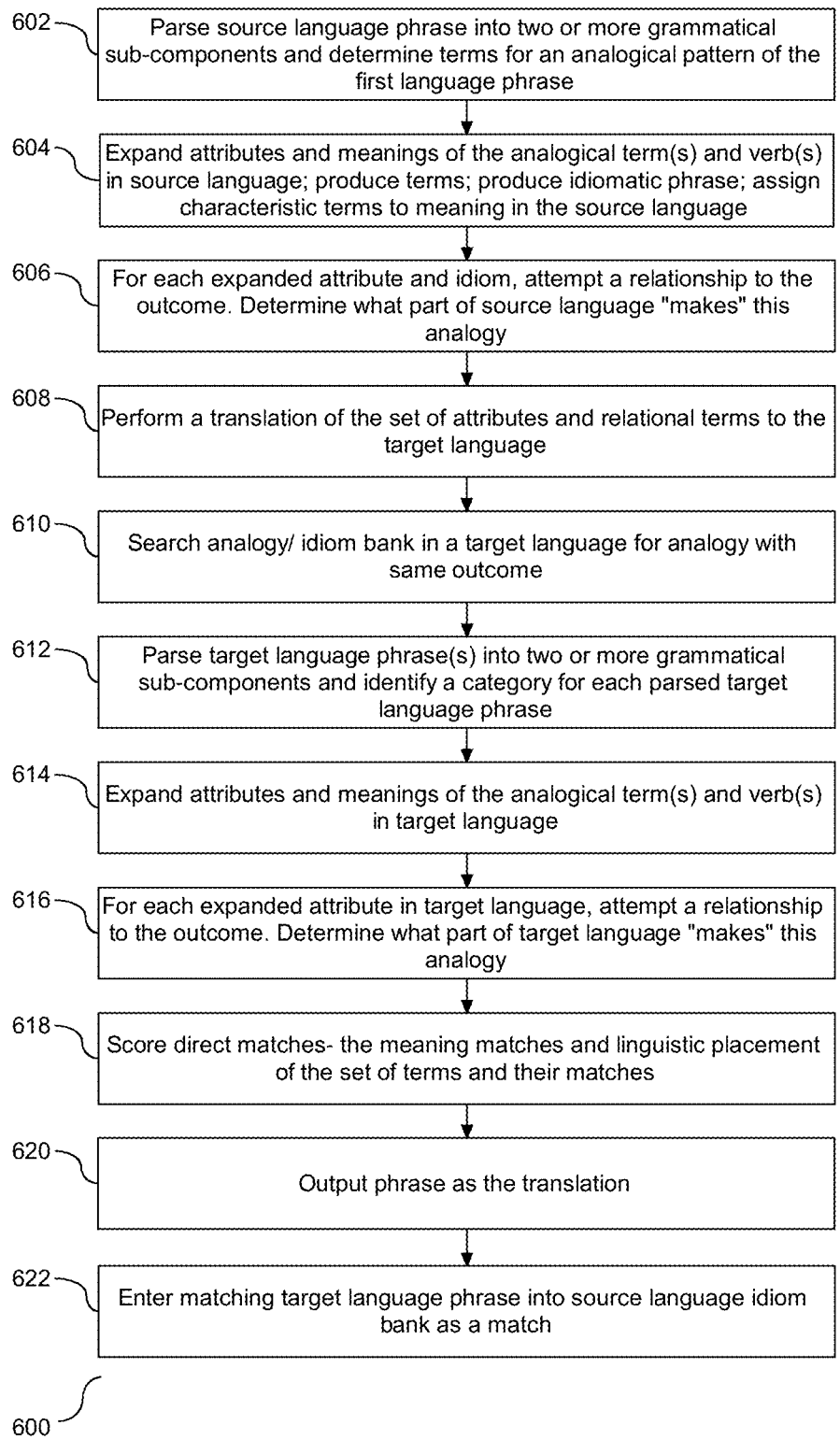
FIG. 6 depicts a flow chart illustrating a method, utilizing an information system for supporting multilingual deciphering of analogical phrases.

Referring to FIG. 6, a flow chart (600) is provided illustrating an aspect of embodiment that may also take the form of a method for use by an intelligent computer platform for deciphering analogical phrases. As shown, a phrase in a first language, also referred to herein as a source language, is parsed into two or more grammatical sub-components in the first language (602). The parsing at step (602) detects the analogical phrase and analogical outcome in the source language, thereby determining the terms for an analogical pattern of the source language phrase. In one embodiment, the parsing at step (602) is modified to handle grammar rules, including adjective and noun placements. Similarly, in one embodiment, the parsing at step (602) is modified to handle verb conjugations, including changing the verb conjugation to an equivalent term, denote the tense, maintain tense parsing characteristics, etc. Accordingly, the parsing of the source language phrase identifies grammatical aspects of the phrases, including but not limited to, one or more grammatical sub-components.

Following step (602), both a category and one or more relational terms in the analogical pattern of the source language phrase are identified (604). More specifically, attributes and meaning of the analogical term(s) and verb(s) in the source language are expanded, and grammatical terms and idiomatic phrases are produced. The identification supports assignment of characteristics to meaning of the terms and phrases in the source language. In one embodiment, the identification at step (604) includes access to a data store in the source language to determine a meaning of the idiomatic phrases, e.g. searching for an idiom that matches the relational term. Using the ascertaining meanings from step (604), a relationship to the outcome is attempted for each expanded attribute and idiom (606). More specifically, for the analogy under consideration, the part of the source language that makes the analogy is determined. The following is an example of a source language analogy using the term pear.

EXAMPLE

The word pear is understood in English to be a fruit, and characterizing terms may include sweet, ripe, and tasty. A weak analogy is the analogy sweet as a constant attribute of taste since a sweet taste is sometimes good but healthy is always good. A strong analogy is ripe as a changing attribute of the fruit. Ripe is the best state of fruit and health is a best state of a person. A moderate analogy is tasty as a constant attribute.

Based on the meanings and attempted relationship(s), the attributes and relational terms are translated to a target language (608). Based on the translation, an idiom bank in the target language is employed to search for the analogy in the target language with the same or a similar outcome as the analogy in the source language (610). More specifically, the idiom bank consultation at step (610) is looking for an equivalent relational term in the target language to identify a potential match of the analogy Accordingly, the source language idiom bank is searched, see step (604), and the target language idiom is searched, see step (610), to contribute to the production of a matching analogy phrase meaning.

Based on the target language idiom bank search at step (610), one or more target language phrases are identified. The target language phrases are subject to evaluation in order to determine a match to the source language analogy. More specifically, for each identified target language phrase, the phrase is parses into two or more grammatical sub-components, and a category for each parsed target language phrases is identified (612). The parsing at step (612) produces attributes for each target phrase. For each of these attributes, means and verbs of the analogical terms are expanded in the target language (614). For example, the term fit is expanded to include adapted, proper, ready, wrong, and convenient, the term right is expanded to include correct, not wring, and convenient, and the term rain is expanded to include falling water, and weather. These examples are for descriptive purposes and should not be considered limiting. It is then determined how well a potential match fits to the source language analogy (616). More specifically, for each expanded attribute in the target language a relationship is attempted to the outcome. In one embodiment, the attempted matching at step (616) includes determining what part of the target language makes the analogy. For example, 'fit fiddle' may be extrapolated to mean a musical instrument can be tuned to an optimal state since fit means proper or ready. As such, this may be considered a strong match. In another example, 'right rain' may be extrapolated to a state of rain. However, it is understood that rain does not have a correct state, and as such, this may be considered a weak match. Accordingly, the attempted match generates one or more potential analogy translations, if any.

Following step (616), one or more matches and associated linguistic placement of the set of terms in the matches are evaluated (618), and in one embodiment, a score is attached. For example, returning to step (606), one or three levels of scores are shown applied to the analogies, although the quantity of levels should not be considered limiting. A numerical value may be assigned to each level, and a statistical evaluation may be employed based on the numerical values. For example, in one embodiment, the number 3 may be assigned to a strong analogy, the number 2 may be assigned to a moderate analogy, and the number 1 may be assigned to a weak analogy, and the statistical evaluation may be in the form of an average of the score assignment in view of the quantity of analogies being evaluated. Other forms of statistical evaluation may be contemplated, and the example shown herein should not be considered limiting. The matching process or algorithm is employed to generate a match, or in one embodiment, an accurate or near accurate translation of the analogy (620). In one embodiment, the match is the form of the analogy translation with the highest score from the statistical evaluation. In one embodiment, and as shown herein a matching target language phrase is entered into the source language idiom bank as a match, such that a subsequent use of the phrase may produce a possible match from a prior iteration (622), e.g. creating a cache of the matching phrase in the idiom bank. Accordingly, following the production of a match of the idiom meaning in the idiom dictionaries, a score and ranking of the linguistic terms and meanings in the target language is produced.

Figure 7:
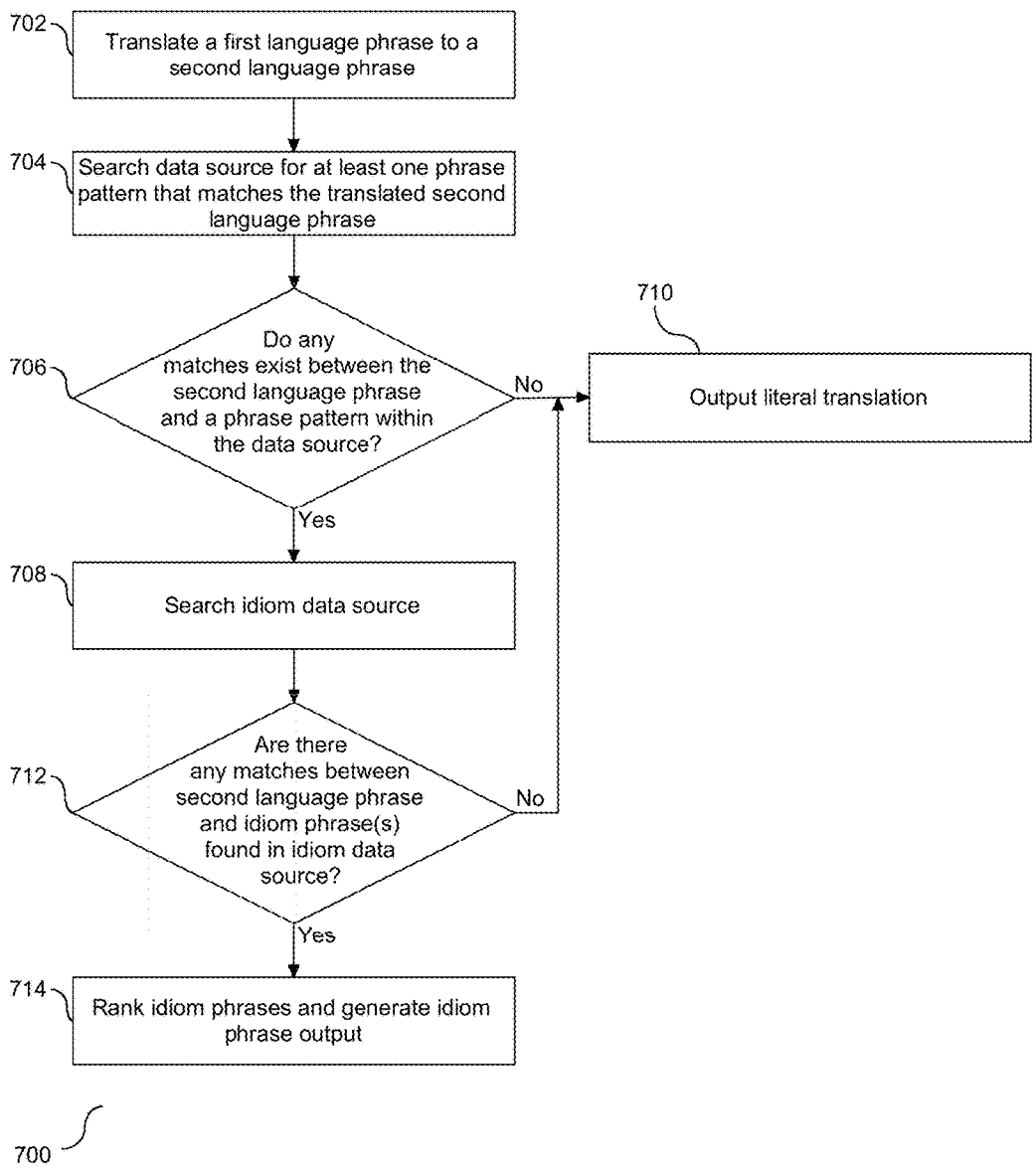
FIG. 7 depicts a flowchart illustrating an embodiment of a method for multilingual analogy detection and resolution.

Referring to FIG. 7, a flow chart (700) is provided illustrating a method utilized by an information handling system comprising a processor and memory, to decipher an analogical phrase. As shown, a first language phrase is translated to a second language phrase (702). The translation is performed for each individual word within the first language phrase. A data source is searched for at least one phrase pattern that matches the translated second language phrase (704). Based on the search, it is determined whether any matches exist between the second language phrase and a phrase pattern within the data source (706). If no matches are found in the data source, the second language phrase, as a literal translation, is outputted as a final output (710). In one embodiment, the second language phrase may also be added to an idiom data source in order to promote machine learning. Accordingly, as phrase translations are created, they are added to the data source so that future translations may access these translations.

If at step (706) a match is found in the data source, an idiom data source is searched for one or more idiom phrases that match the second language phrase (708). It is then determined if there are any matches between second language phrase and the idiom phrases found in the idiom data source (712), e.g. idiom corpus or idiom dictionary. If no matches are found in the idiom data source, the second language phrase is outputted as the final output (710). At this stage, the second language phrase may also be added to the idiom data source in order to promote machine learning for future translation needs. If at least one match is found in the idiom data source, as evidenced by a positive response to the determination at step (712), the idiom phrases are ranked according to similarity to the second language phrase, and idiom phrase with a highest similarity ranking is outputted as the final output (714).

It will be appreciated that there is disclosed herein a system, method, apparatus, and computer program product for evaluating natural language input, detecting an analogical pattern at an information handling system, and accurately translating the detected pattern. As disclosed, the system, method, apparatus, and computer program product apply natural language processing to an information source to identify an analogical pattern in the input, with the identification including a subject term, a first verb phrase, a comparator term, a second verb phrase, and an object term. For example, the first analogical pattern may include a first analogic (which includes a subject noun term and a first verb), an adjective/idiom comparator term, and a second analogic (which includes a second verb and a noun object term).

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a machine learning model based on pattern dissection of analogies and their meanings to determine outcomes, including an extended characteristic of key items in the analogical patterns.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments of the invention have been described herein for purposes of illustration, various modifications may be made without departing from the spirit and scope of the invention. In particular, the natural language processing may be carried out by different computing platforms or across multiple devices. Furthermore, the data source, data store and/or corpus may be localized, remote, or spread across multiple systems. Accordingly, the scope of protection of this invention is limited only by the following claims and their equivalents.

What is claimed is:

1. A computer system comprising:
   a processing unit operatively coupled to memory;
   an artificial intelligence platform, in communication with the processing unit;
   a tool in communication with the processing unit to decipher a phrase upon activation by the artificial intelligence platform, including the tool to:
   parse a first language phrase into two or more grammatical sub-components using a parser;
   identify a category for each parsed grammatical sub-component;
   use the identified categories to determine metadata and definitions of the parsed grammatical components in the first language;
   translate the determined definitions to one or more second language definitions;
   search and obtain a first data source for a meaning of the first language phrase, wherein the first data source stores at least one phrase and corresponding meaning in the first language;
   translate the meaning from the first language to a second language meaning;
   converge the second language meaning with the metadata and second language definitions to produce a target phrase;
   search a second data source and score the target phrase against second language phrases within the second data source;
   apply a ranking to the second language phrases according to similarity to the target phrase; and
   output a final phrase and meaning, the final phrase and meaning being in the second language and responsive to the ranking.

2. The computer system of claim 1, wherein metadata includes data selected from the group consisting of: geographic source, language used, nationality, age, and subject matter.

3. The computer system of claim 1, further comprising application of the final phrase output to annotate the first language phrase.

4. The computer system of claim 1, wherein the parser is a linguistic parser.

5. A computer program product to decipher a phrase, the computer program product comprising a computer readable storage device having program code embodied therewith, the program code executable by a processing unit to:
   parse a first language phrase into two or more grammatical sub-components using a parser;
   identify a category for each parsed grammatical sub-component;
   use the identified categories to determine two or more attributes and definitions of the parsed grammatical components in the first language;
   translate the determined two or more attributes and definitions to second language attributes and definitions;
   search and obtain a first data source for a meaning of the first language phrase, wherein the first data source stores phrases and corresponding meanings in the first language;
   translate the meaning from the first language to a second language meaning;
   converge the second language meaning with the second language attributes and definitions to produce a target phrase;
   search a second data source and score the target phrase against second language phrases within the second data source;
   apply a ranking to the second language phrases according to similarity to the target phrase; and
   output a final phrase responsive to the applied ranking.

6. The computer program product of claim 5, wherein metadata includes data selected from the group consisting of: geographic source, language used, nationality, age, and subject matter.

7. The computer program product of claim 5, further comprising program code to annotate the first language phrase, wherein the annotation includes an application the final phrase output to the first language phrase.

8. The computer program product of claim 5, wherein the parser is a linguistic parser.

9. A method to computationally resolve the meaning of an analogy, the method comprising:
   parsing a first language phrase into two or more grammatical sub-components using a parser;
   identifying a category for each parsed grammatical sub-component;
   using the identified categories to determine two or more attributes and definitions of the parsed grammatical components in the first language;
   translating the determined two or more attributes and definitions to second language attributes and definitions;
   searching and obtaining a first data source for a meaning of the first language phrase, wherein the first data source stores phrases and corresponding meanings in the first language;
   translating the meaning from the first language to a second language meaning;
   converging the second language meaning with the second language attributes and definitions to produce a target phrase;
   searching a second data source and scoring the target phrase against second language phrases within the second data source;
   applying a ranking to the second language phrases according to similarity to the target phrase; and
   outputting a final phrase responsive to the ranking.

10. The method of claim 9, wherein metadata includes data selected from the group consisting of: geographic source, language used, nationality, age, and subject matter.

11. The method of claim 9, further comprising annotating the first language phrase, including applying the final phrase output to the first language phrase.

12. The method of claim 9, wherein the parser is a linguistic parser.

* * * * *